US010170289B2

(12) United States Patent
Cao et al.

(10) Patent No.: US 10,170,289 B2
(45) Date of Patent: Jan. 1, 2019

(54) PHOTOTUBE AND METHOD OF MAKING IT

(71) Applicant: Shenzhen Genorivision Technology Co., Ltd., Shenzhen (CN)

(72) Inventors: Peiyan Cao, Shenzhen (CN); Yurun Liu, Shenzhen (CN)

(73) Assignee: Shenzhen Genorivision Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/309,613

(22) PCT Filed: Sep. 14, 2015

(86) PCT No.: PCT/CN2015/089552
§ 371 (c)(1),
(2) Date: Nov. 8, 2016

(87) PCT Pub. No.: WO2017/045108
PCT Pub. Date: Mar. 23, 2017

(65) Prior Publication Data
US 2018/0182602 A1 Jun. 28, 2018

(51) Int. Cl.
*H01J 43/28* (2006.01)
*H01J 40/06* (2006.01)
*H01J 40/02* (2006.01)
*G01J 1/44* (2006.01)
*H01J 9/18* (2006.01)

(52) U.S. Cl.
CPC ............... *H01J 40/06* (2013.01); *G01J 1/44* (2013.01); *H01J 9/18* (2013.01); *H01J 40/02* (2013.01); *H01J 43/28* (2013.01); *G01J 2001/4453* (2013.01)

(58) Field of Classification Search
CPC ...................................................... H01J 43/04
See application file for complete search history.

(56) References Cited

U.S. PATENT DOCUMENTS

| 3,244,922 | A | * | 4/1966 | Wolfgang | ............... | H01J 43/24 |
| | | | | | | 313/103 R |
| 3,787,745 | A | | 1/1974 | Wulms | | |
| 6,297,489 | B1 | | 10/2001 | Suyama et al. | | |
| 2005/0074784 | A1 | | 4/2005 | Vo-Dinh | | |
| 2005/0174052 | A1 | * | 8/2005 | Niigaki | ..................... | H01J 1/34 |
| | | | | | | 313/530 |

(Continued)

FOREIGN PATENT DOCUMENTS

| CN | 101848757 A | 9/2010 |
| CN | 103223357 A | 7/2013 |

(Continued)

*Primary Examiner* — Thanh Luu
(74) *Attorney, Agent, or Firm* — IPro, PLLC; Qian Gu; Na Xu

(57) ABSTRACT

A phototube suitable for detecting a photon, comprising: an electron ejector configured for emitting electrons in response to an incident photon; a detector configured for collecting the electrons and providing an output signal representative of the incident photon; an electrode configured for applying a voltage to drive the electrons to the detector; and one or more sidewalls forming an envelope of a hole between the electrode and the detector, wherein the electron ejector is inside the hole and bonded to the electrode.

22 Claims, 16 Drawing Sheets

(56) References Cited

U.S. PATENT DOCUMENTS

| | | |
|---|---|---|
| 2008/0265769 A1 | 10/2008 | Contarino et al. |
| 2009/0212699 A1* | 8/2009 | Ohmura .............. H01J 43/26 |
| | | 313/533 |
| 2009/0315443 A1 | 12/2009 | Sullivan et al. |
| 2010/0140460 A1 | 6/2010 | Rigneault et al. |
| 2011/0053799 A1 | 3/2011 | Abiko et al. |
| 2014/0256057 A1 | 9/2014 | Ozawa et al. |
| 2014/0274746 A1 | 9/2014 | Khurana et al. |
| 2014/0295577 A1 | 10/2014 | Matsuzawa et al. |
| 2015/0079596 A1 | 3/2015 | Eltoukhy et al. |

FOREIGN PATENT DOCUMENTS

| | | |
|---|---|---|
| CN | 103296035 A | 9/2013 |
| CN | 103857997 A | 6/2014 |

\* cited by examiner

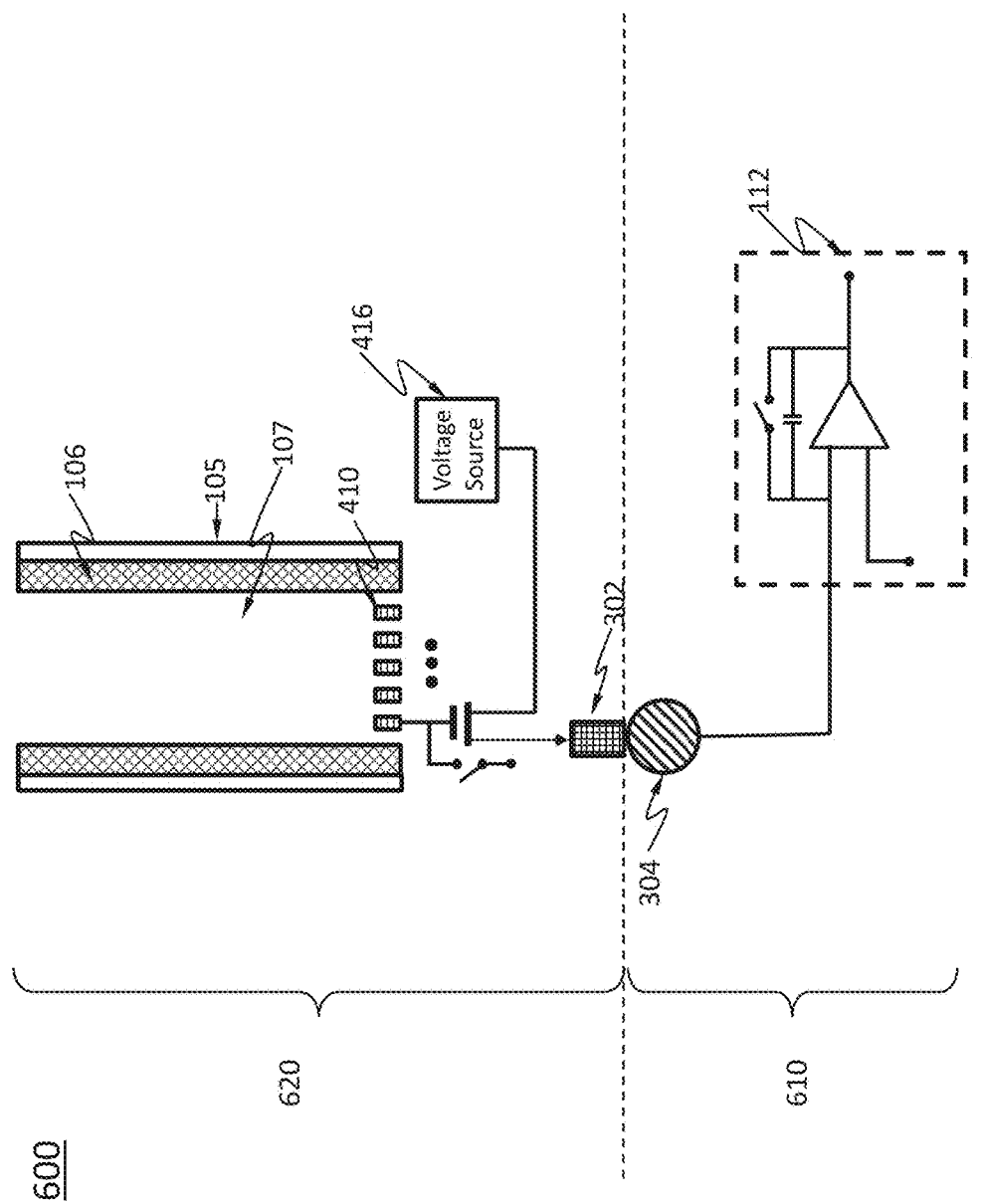

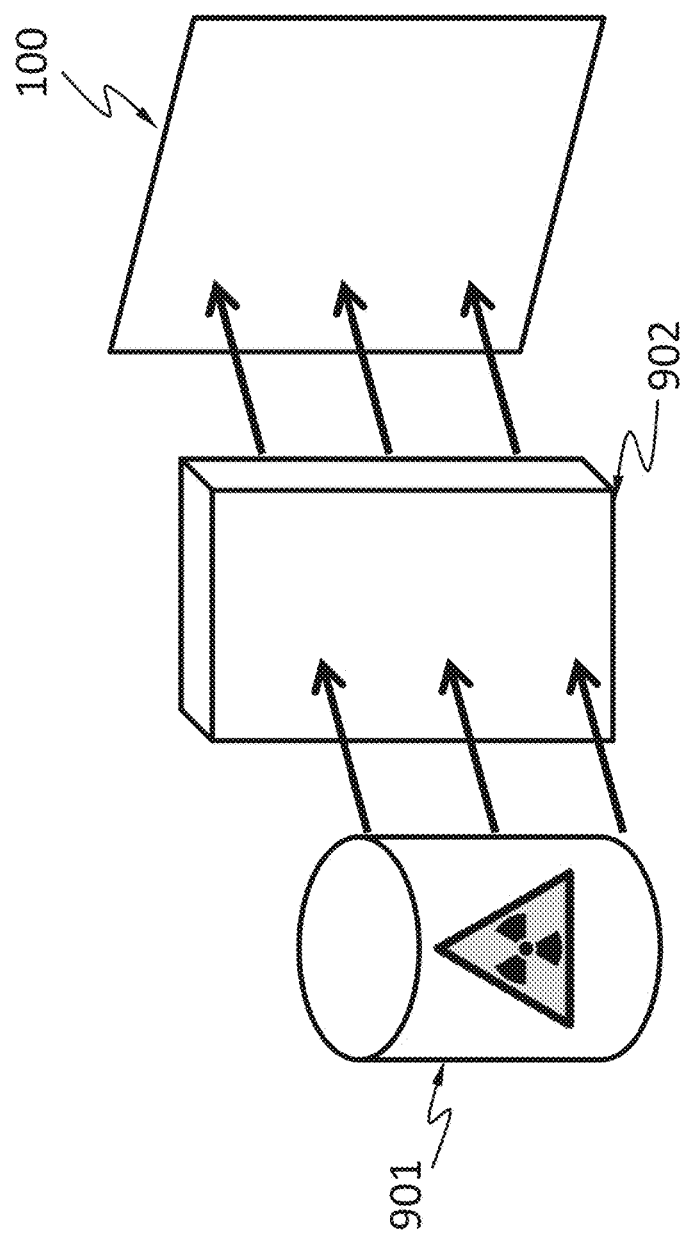

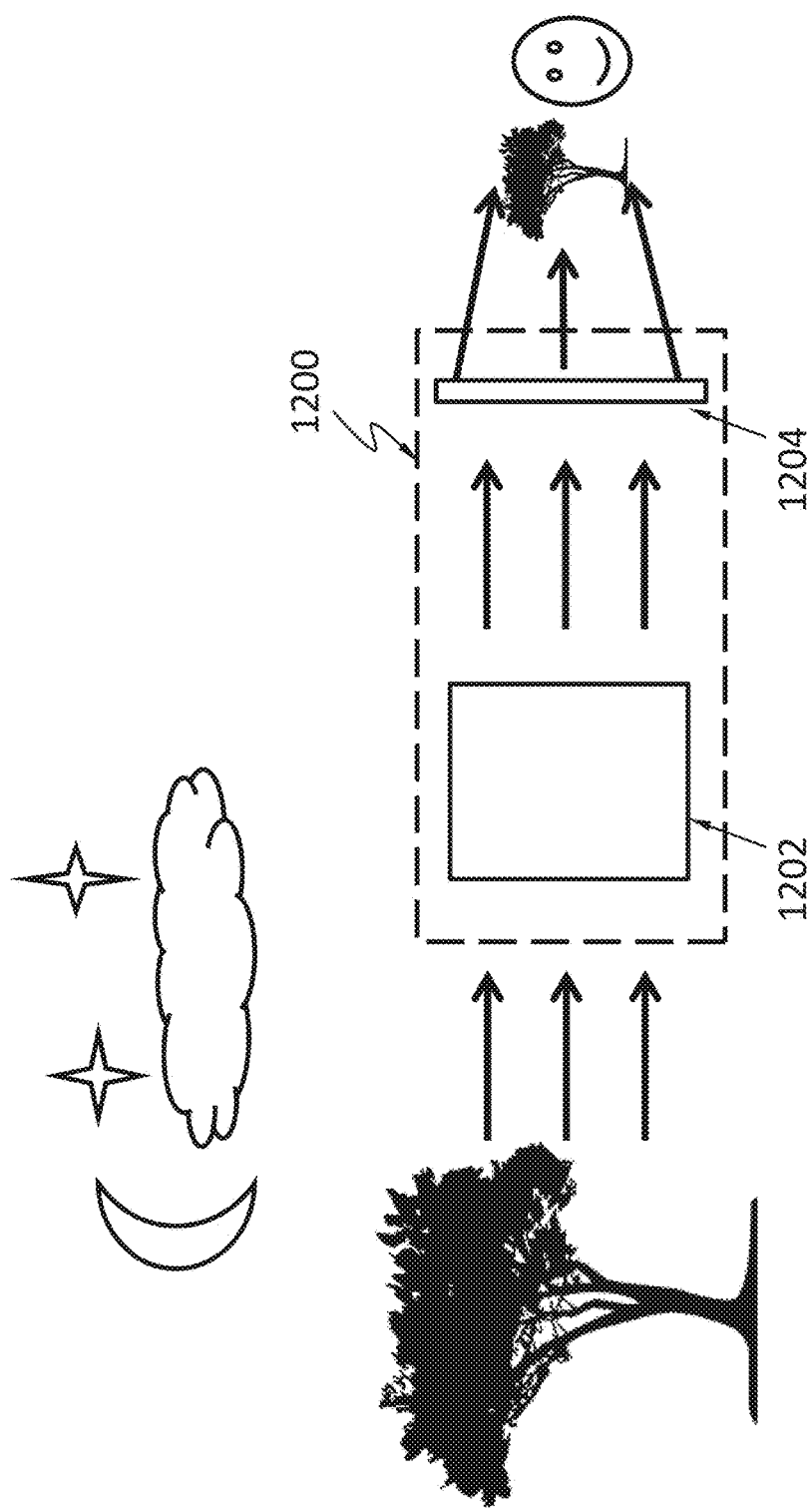

PHOTOTUBE AND METHOD OF MAKING IT

TECHNICAL FIELD

The disclosure herein relates to tubes, particularly relates to a phototube and a method of making it.

BACKGROUND

A phototube, or photoelectric cell, or photo-emissive cell, may be a sensitive detector of light in the ultraviolet, visible, and near-infrared ranges of the electromagnetic spectrum.

A photomultiplier tube is a vacuum phototube that is able to multiply the current produced by incident light by many times, thus enabling individual photons to be detected when the incident flux of light is very low. Photomultiplier tubes have important applications in nuclear and particle physics, astronomy, medical diagnostics including blood tests, medical imaging, motion picture film scanning, radar jamming, and high-end image scanners known as drum scanners.

A conventional photomultiplier tube (PMT) includes a housing containing a photocathode, several dynodes and an electron collector. Light entering the tube and incident on the photocathode causes electrons to be emitted by the photocathode, as a consequence of the photoelectric effect. The electrons impinge on the successive dynodes, causing electron multiplication by secondary emission. After impingement on the last dynode, the electrons are collected by the collector and used for detection of the incident light.

Although the successive dynodes help to increase the number of electrons reaching the collector by secondary emission, the successive dynodes also make the conventional PMT huge, heavy, and difficult to produce.

SUMMARY

Disclosed herein is a phototube suitable for detecting a photon, the phototube comprising: an electron ejector configured for emitting electrons in response to an incident photon; a detector configured for collecting the electrons and providing an output signal representative of the incident photon; an electrode configured for applying a voltage to drive the electrons to the detector; and one or more sidewalls forming an envelope of a hole between the electrode and the detector, wherein the electron ejector is inside the hole and bonded to the electrode.

According to an embodiment, the hole includes an empty region between the electron ejector and the detector.

According to an embodiment, the phototube further comprises a metal wall bonded to an inside surface of each of the one or more sidewalls.

According to an embodiment, the metal wall is configured for applying a voltage to drive the electrons away from the sidewall.

According to an embodiment, the metal wall includes at least one of the following: a mesh of a conductive material; a solid metal sheet; and a plurality of metal lines.

According to an embodiment, the phototube further comprises a supporting substrate bonded to the electrode, wherein the electrode is between the supporting substrate and the electron ejector.

According to an embodiment, the detector includes one or more electrodes and an amplifier electrically connected to the one or more electrodes.

According to an embodiment, the amplifier is electrically connected to the one or more electrodes via a through-silicon via (TSV).

According to an embodiment, each of the one or more electrodes includes a transistor whose output is directed into the amplifier.

According to an embodiment, the hole has an a cylindrical shape such that the hole gradually becomes smaller from the electrode to the detector.

According to an embodiment, the detector includes one or more electrodes and an oscillator electrically connected to the one or more electrodes.

According to an embodiment, the phototube further comprises a peripheral circuitry bonded to an outside surface of one of the one or more sidewalls.

Disclosed herein is a method for making a phototube suitable for detecting a photon, the method comprising: forming a hole on a first substrate such that an envelope of the hole is formed by one or more sidewalk inside the first substrate; forming a detector at the bottom of the hole on the first substrate; forming an electron ejector on an electrode on a second substrate; and bonding the second substrate to the first substrate such that the electron ejector is inside the hole, wherein the electron ejector is configured for emitting electrons in response to an incident photon, the detector is configured for collecting the electrons and providing an output signal representative of the incident photon, and the electrode is configured for applying a voltage to drive the electrons to the detector.

According to an embodiment, the hole includes an empty region between the electron ejector and the detector.

According to an embodiment, the method further comprises bonding a metal wall to an inside surface of each of the one or more sidewalls.

According to an embodiment, the metal wall is configured for applying a voltage to drive the electrons away from the sidewall.

According to an embodiment, the metal wall includes at least one of the following: a mesh of a conductive material; a solid metal sheet; and a plurality of metal lines.

According to an embodiment, the detector includes one or more electrodes and an amplifier electrically connected to the one or more electrodes.

According to an embodiment, the amplifier is electrically connected to the one or more electrodes via a TSV.

According to an embodiment, each of the one or more electrodes includes a transistor whose output is directed into the amplifier.

According to an embodiment, the hole has an a cylindrical shape such that the hole gradually becomes smaller from the electrode to the detector.

According to an embodiment, the detector includes one or more electrodes and an oscillator electrically connected to the one or more electrodes.

According to an embodiment, the method further comprises bonding a peripheral circuitry to an outside surface of one of the one or more sidewalls.

Disclosed herein is a night vision device suitable for producing an image viewable to a human eye, the night vision device comprising: the phototube of claim 1, wherein the phototube is configured for detecting a photon from a dimly light source.

According to an embodiment, the dimly light source emits either visible light or infrared at a light intensity that is at least 4-5 orders of magnitude less than that of daylight.

Disclosed herein is a method for making a phototube suitable for detecting a photon, the method comprising:

providing a first substrate with a first electrode and an electron ejector on the first electrode; providing a second substrate with a second electrode and a detector connected to the second electrode; wherein at least one of the first substrate and the second substrate comprises a series of protrusions thereon; bonding the first substrate and the second substrate such that the first substrate, the second substrate, and the protrusions form a hole with the electron ejector being inside the hole; wherein the electron ejector is configured for emitting electrons in response to an incident photon; wherein the detector is configured for collecting the electrons and providing an output signal representative of the incident photon, and wherein the first and second electrodes are configured for applying a voltage to drive the electrons to the detector.

BRIEF DESCRIPTION OF FIGURES

FIG. 5C schematically shows a partial cross-sectional view of another exemplary phototube including digital and analog circuits built in different wafers, according to an embodiment of the present teaching.

FIG. 9 schematically shows a system comprising the phototube described herein, suitable for detecting ionizing radiation, according to an embodiment of the present teaching.

FIG. 12 schematically shows a night vision device comprising the phototube described herein, according to an embodiment of the present teaching.

DETAILED DESCRIPTION

Figure 1:
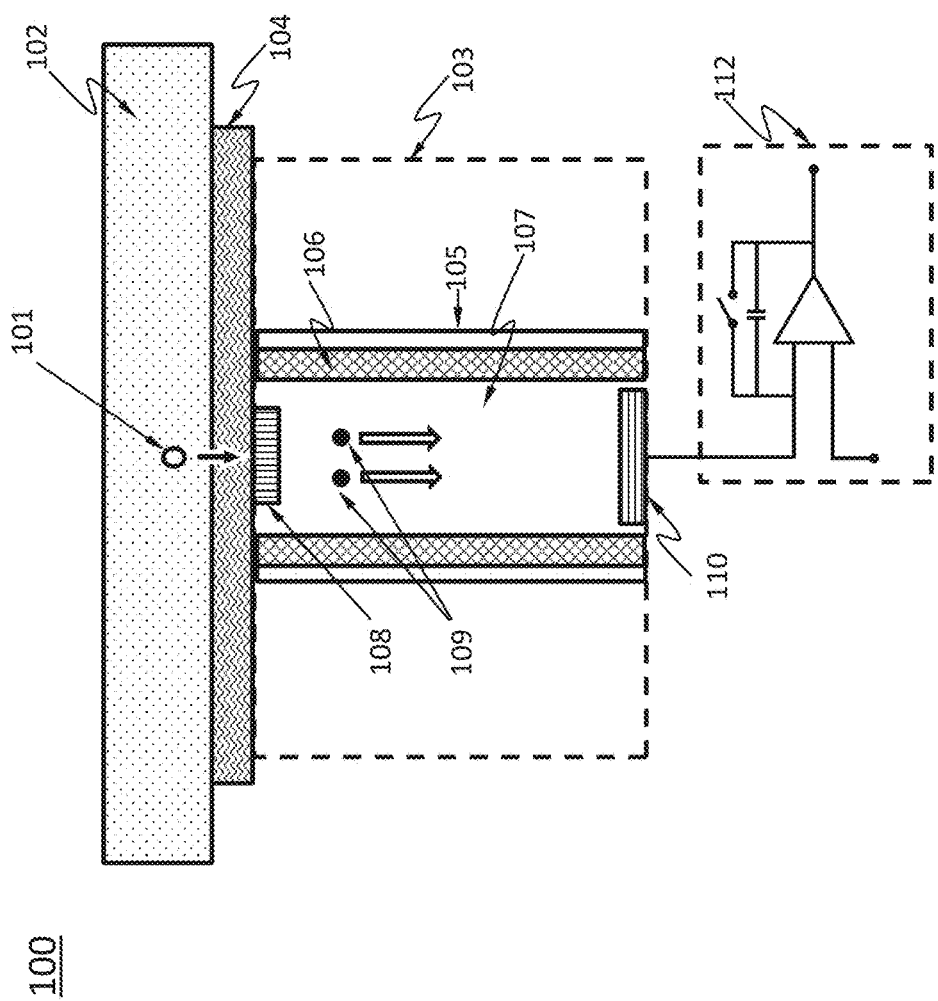
FIG. 1 schematically shows a cross-sectional view of an exemplary phototube, according to an embodiment of the present teaching.

FIG. 1 schematically shows a cross-sectional view of an exemplary phototube 100, according to an embodiment of the present teaching. As shown in FIG. 1, the phototube 100 may comprise a supporting substrate 102, a transparent electrode 104, an electron ejector 108, and a detector that includes an electrode 110 and an amplifier 112.

In an embodiment, the supporting substrate 102 may be a wafer onto which the transparent electrode 104 is deposited. The supporting substrate 102 can provide mechanical support for the phototube 100. The transparent electrode 104 is transparent such that a light photon 101 entering the phototube 100 may go through the transparent electrode 104 and incident on the electron ejector 108 that is bonded to the transparent electrode 104. The supporting substrate 102 can be transparent or has an opening that exposes a portion of the transparent electrode 104 over the hole 107.

The electron ejector 108 in this example is configured for emitting electrons 109 in response to an incident photon 101, e.g. a light photon in the ultraviolet, visible, or near-infrared ranges of the electromagnetic spectrum. The electron ejector 108 may be very thin, e.g. having a thickness of several microns to hundreds of microns. The electron ejector 108 can be made by at least one of the materials: bialkali (such as Na—K—Sb), multialkali (such as Na—K—Sb—Cs), Ag—O—Cs, Sb—Cs, InGaAs, GaAs, Cs—Te, Cs—I, etc.

The electrode 110 in this example is configured for collecting the electrons 109 emitted by the electron ejector 108. The amplifier 112 is electrically connected to the electrode 110 and is configured for providing an output signal representative of the incident photon that causes the electrons 109 emitted by the electron ejector 108. In one example, the output signal may indicate a voltage change that can be used to determine an existence of incident photons. The transparent electrode 104 here can establish an electric field to drive the electrons 109 emitted by the electron ejector 108 toward the electrode 110.

As shown in FIG. 1, the phototube 100 further comprises one or more sidewalk 105 that form an envelope of a hole 107 between the transparent electrode 104 and the electrode 110. The electron ejector 108 is inside the hole 107 or is at the upper portion of the hole 107. The electrode 110 may also be inside the hole and be at the bottom of the hole 107. The hole 107 includes an empty region between the electron ejector 108 and the electrode 110, such that the electrons 109 emitted by the electron ejector 108 can fall directly onto the electrode 110 within the hole 107, without hitting another electron ejector like in a conventional PMT.

In an embodiment, the hole 107 is formed in a substrate 103 included in the phototube 100. The substrate 103 may include a material like silicon oxide. The electrode 110 may be formed at the bottom of the hole on the substrate 103. The hole 107 can be either a vacuum, or filled with a gas.

In an embodiment, the phototube 100 further comprises metal walls 106 each of which is bonded to an inside surface of a sidewall 105. The metal wall 106 may be formed by deep reactive ion etching (RIE) and chemical etch to remove oxide. The metal wall 106 can apply a voltage to push the electrons 109 away from the sidewalk, and can prevent chemical etch of the sidewall. The metal wall 106 is optional in the present teaching.

In one embodiment, both the hole 107 and the amplifier 112 are formed in the substrate 103. In another embodiment, the amplifier 112 and the electrode 110 are formed on a separate wafer which is then bonded (e.g., direct bonding or by adhesive) to the substrate 103. The supporting substrate 102 can be separate wafer from the substrate 103. Namely, the phototube 100 may be constructed using two wafers (the supporting substrate 102 including the transparent electrode 104 and the electron ejector 108, the substrate 103 including the hole 107 and the amplifier 112), or three wafers (the supporting substrate 102 including the transparent electrode 104 and the electron ejector 108, the substrate 103 including the hole 107, and a wafer including amplifier 112).

Each photon hitting the electron ejector 108 will eject a small number of electrons, which will be driven toward the electrode 110 by a voltage applied from the transparent electrode 104, collected by the electrode 110, and detected by the amplifier 112 that may be a charge amplifier. The amplifier 112 can effectively cut the capacitance of the electrode 110 by the gain of the amplifier 112. For example, if the actual capacitance of the electrode 110 is 5 fF, and the gain is 100, the effective capacitance of the electrode 110 will be 0.05 fF. Each electron collected by the electrode 110 will cause about 3.2 mV voltage change at the amplifier 112. Accordingly, based on the voltage change calculated at the amplifier 112, the phototube 100 may determine whether there is an incident photon and how many photons incident on the electron ejector 108 during a given period of time.

When a plurality of the phototubes 100 forms an array, a spatial distribution (e.g., an image) of incident light intensity may be determined by individually measuring the voltage change at an amplifier of each phototube of the array.

According to an embodiment of the present teaching, the phototube 100 may be fabricated using a method including: forming a hole on a first substrate (e.g., substrate 103) such that an envelope of the hole is formed by one or more sidewalls inside the first substrate; forming a detector at the bottom of the hole on the substrate; forming an electron ejector an electrode on a second substrate; and bonding the second substrate to the first substrate such that the electron ejector is inside the hole, wherein the electron ejector is configured for emitting electrons in response to an incident photon, the detector is configured for collecting the electrons and providing an output signal representative of the incident photon, and the electrode is configured for applying a voltage to drive the electrons to the detector.

Figure 2:
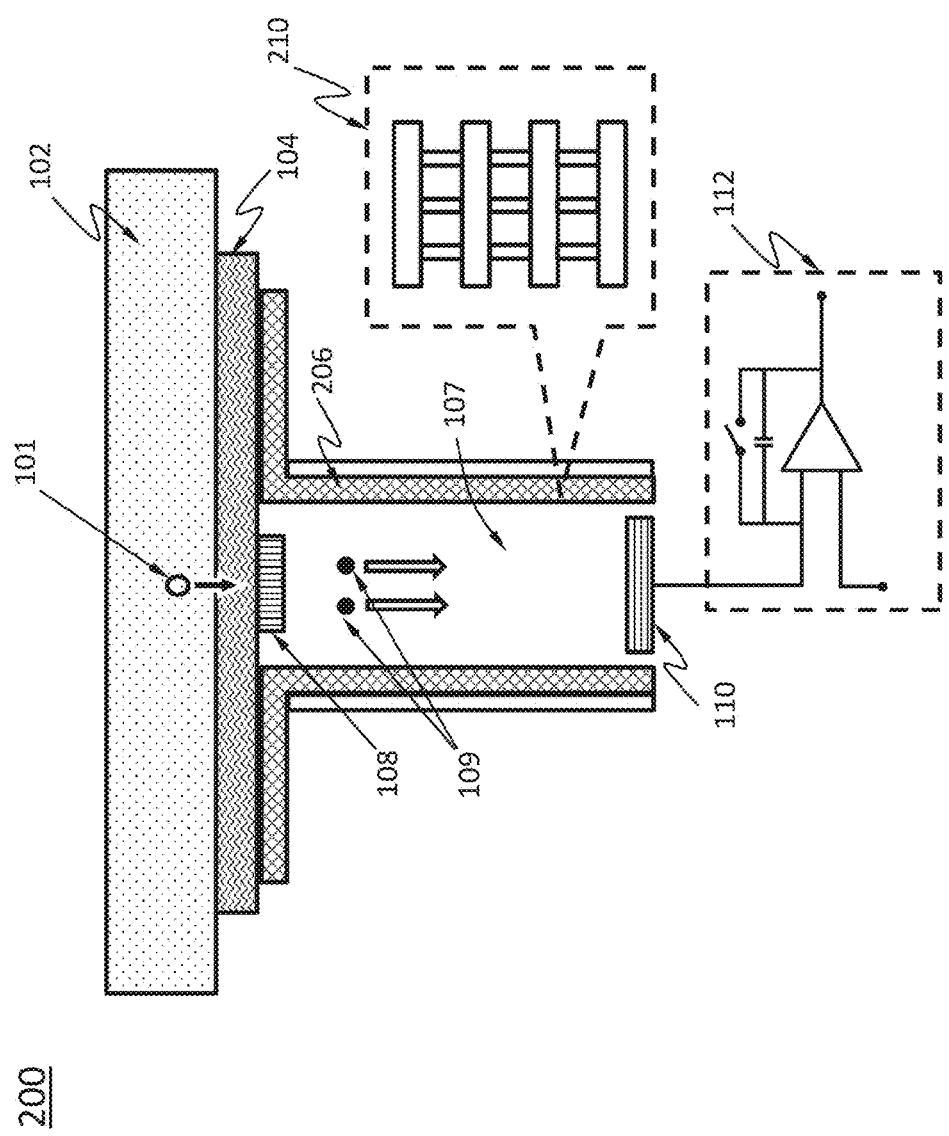
FIG. 2 schematically shows a cross-sectional view of another exemplary phototube, according to an embodiment of the present teaching.

FIG. 2 schematically shows a cross-sectional view of another exemplary phototube 200 including a metal wall 206, according to an embodiment of the present teaching, wherein like numbers reference like elements as in FIG. 1. In this example, the metal wall 206 in the phototube 200 extends in an area surrounding the entrance of the hole. In addition, the metal wall 206 may include a mesh of a conductive material 210, a solid metal sheet; or a plurality of metal lines. One way of making the metal wall 106 or 206 may include electroplating onto a series of wires exposed in the hole 107.

Figure 3:
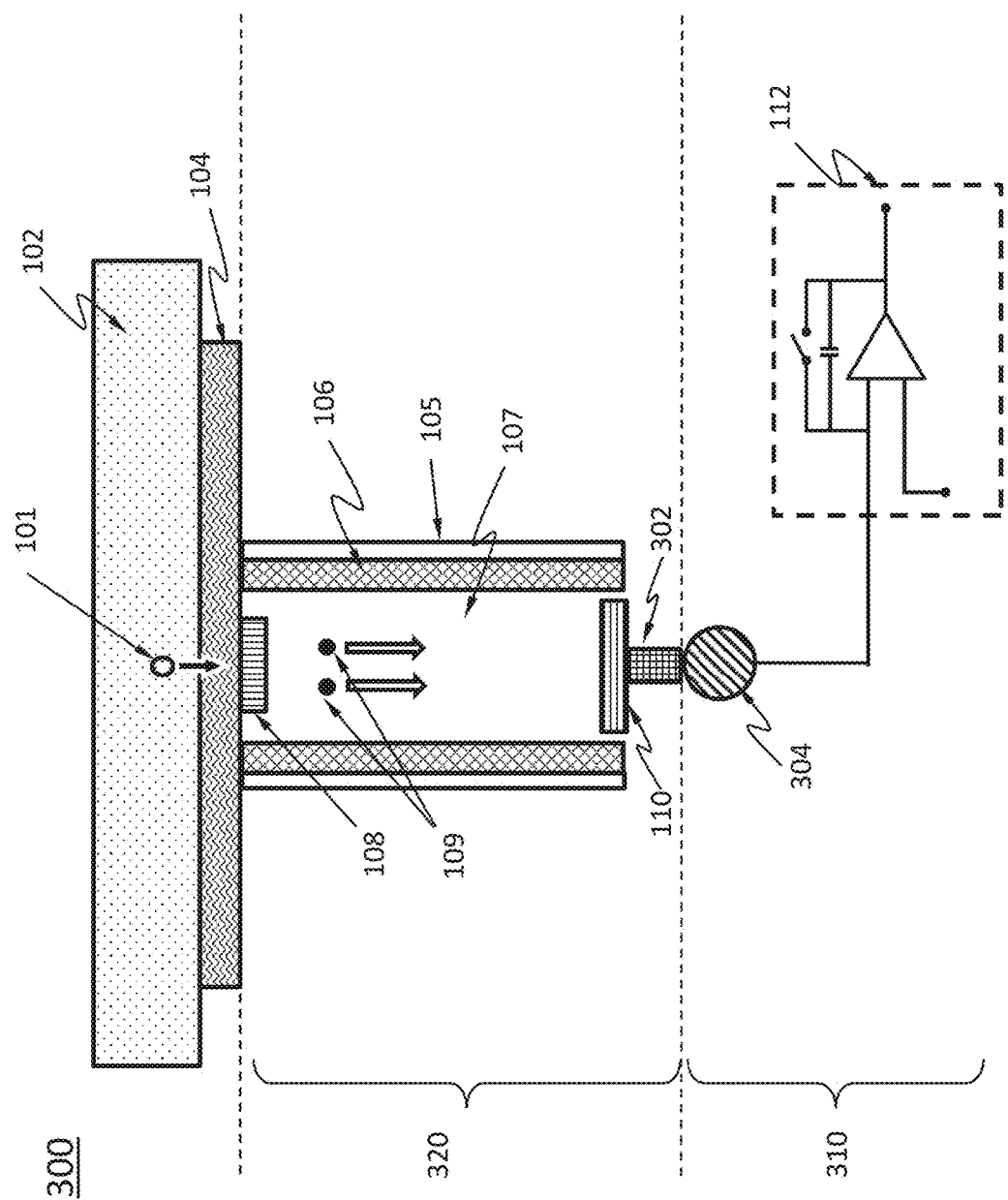
FIG. 3 schematically shows a cross-sectional view of another exemplary phototube including a through-silicon via (TSV), according to an embodiment of the present teaching.

FIG. 3 schematically shows a cross-sectional view of another exemplary phototube 300 including a TSV 302, according to an embodiment of the present teaching, wherein like numbers reference like elements as in previous figures. As discussed above, the amplifier 112 may be formed on a separate wafer 310 that is bonded to the wafer 320 including the hole 107. The wafer 310 in the phototube 300 may be a CMOS (complementary metal-oxide semiconductor) wafer. The phototube 300 in this example includes a TSV 302 to electrically connect the electrode 110 to the amplifier 112 in the wafer 310, e.g. by a solder ball 304. The TSV 302 and the electrode 110 may be part of the wafer 320. This can help to avoid fabrication on the CMOS wafer 310, and thus avoiding the risk of destroying the expensive CMOS wafer 310. The wafer 320 may also include an analog circuit. The electrode 110 and the metal wall 106 may function as etch stop.

Figure 4:
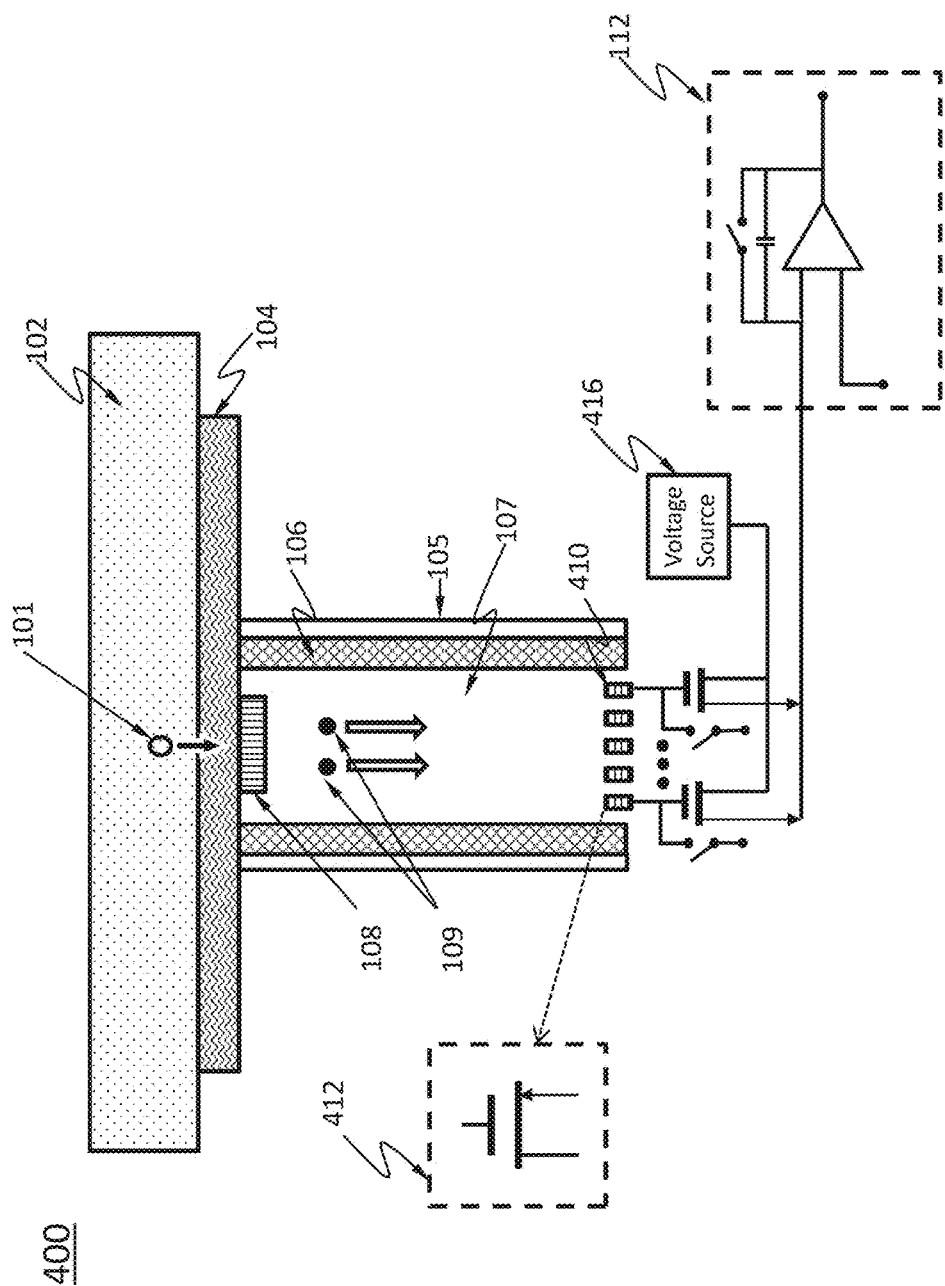
FIG. 4 schematically shows a cross-sectional view of another exemplary phototube including a plurality of transistors, according to an embodiment of the present teaching.

FIG. 4 schematically shows a cross-sectional view of another exemplary phototube 400 including a plurality of transistors, according to an embodiment of the present teaching, wherein like numbers reference like elements as in previous figures. As shown in FIG. 4, instead of including one big electrode, the detector in the phototube 400 includes many tiny electrodes 410. Each electrode 410 may include a transistor 412 that is electrically connected to the amplifier 112. Each transistor 412 may be a P-type metal-oxide-semiconductor (PMOS) or N-type metal-oxide-semiconductor (NMOS) serving as a current source. Each transistor 412 may have a floating gate with a capacitance of about $10^{-18}$ F to $10^{-17}$ F. In that case, a single electron can generate a voltage of 10 to 100 mV on the gate of the transistor 412. The transistors 412 may share a common voltage source 416.

When a transistor 412 is applied with a voltage due to the collected electrons caused by the incident photon, the transistor 412 will have a current output. The current outputs from all the transistors 412 whose gates are in the same hole 107 are directed to the same amplifier 112. The amplifier 112 in this example combines the current outputs from all the transistors 412 to detect the total current change, hence to determine an existence of an incident photon.

Figure 5A:
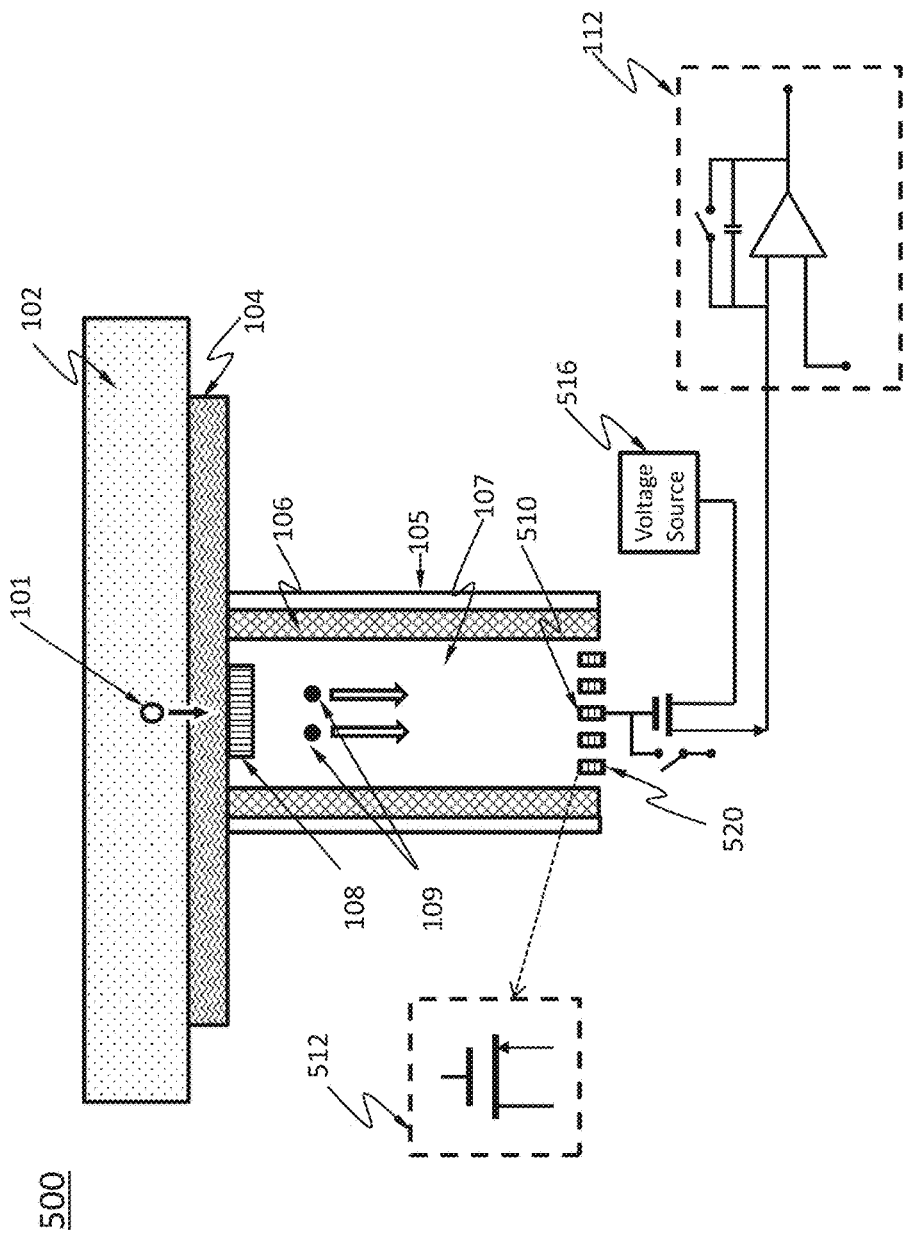
FIG. 5A schematically shows a cross-sectional view of another exemplary phototube, according to an embodiment of the present teaching.

FIG. 5A schematically shows a cross-sectional view of another exemplary phototube 500, according to an embodiment of the present teaching, wherein like numbers reference like elements as in previous figures. As shown in FIG. 5A, instead of including one big electrode, the detector in the phototube 500 includes one or more electrodes 510. Each electrode 510 may include a transistor 512 that is electrically connected to the amplifier 112. The detectors also includes one or more focusing electrodes 520 configured for focusing electrons 109 toward the electrodes 510. The focusing electrodes 520 may focus the electrons 109 by an electrical potential. In this example, a single incident photon may cause about 1 V voltage change on the transistor. Each transistor 512 may be a P-type metal-oxide-semiconductor (PMOS) or N-type metal-oxide-semiconductor (NMOS) serving as a current source. Each transistor 512 may have a floating gate with a capacitance of about $10^{-18}$ F to $10^{-17}$ F. In that case, a single electron can generate a voltage of 10 to 100 mV on the gate of the transistor 512. The transistors 512 may share a common voltage source 516.

When a transistor 512 is applied with a voltage due to the collected electrons caused by the incident photon, the transistor 512 will have a current output. The current outputs from all the transistors 512 whose gates are in the same hole 107 are directed to the same amplifier 112. The amplifier 112 in this example combines the current outputs from all the transistors 512 to detect the total current change, hence to determine an existence of an incident photon.

Figure 5B:
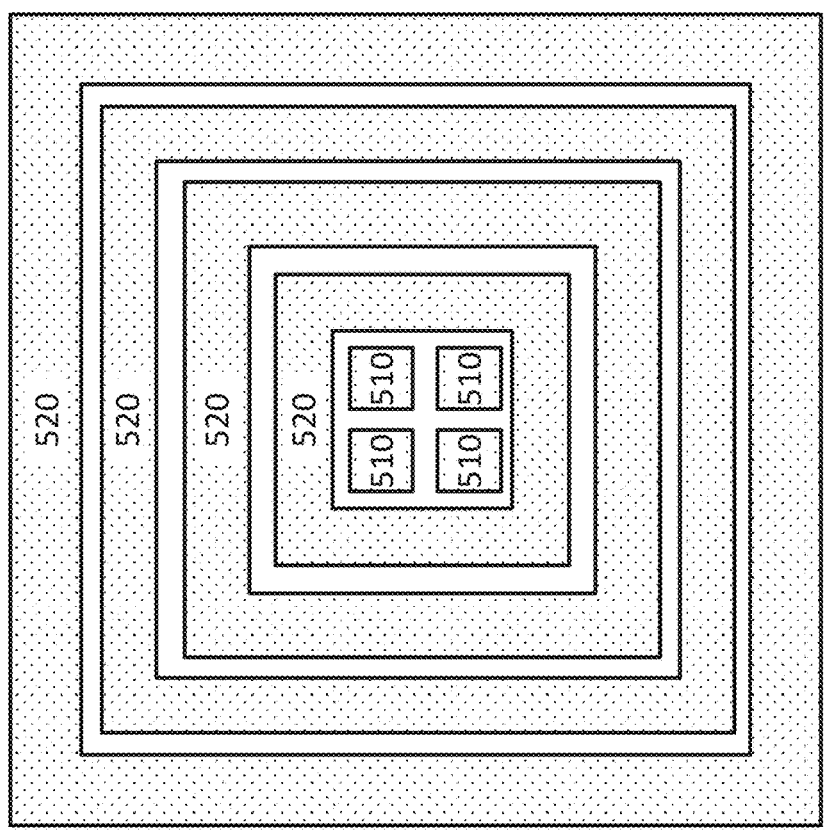
FIG. 5B schematically shows an example of the arrangement of the electrodes in FIG. 5A.

FIG. 5B schematically shows an example of the arrangement of the electrodes 510 and the focusing electrodes 520.

FIG. 5C schematically shows a partial cross-sectional view of another exemplary phototube 600 including digital and analog circuits built in different wafers, according to an embodiment of the present teaching, wherein like numbers reference like elements as in previous figures. Similar to the phototube 300, the phototube 600 in this example includes a CMOS wafer 610 including digital circuits like the amplifier 112 and includes an analog wafer 620 including the hole 107, the electrodes or transistors 410 and some analog circuits. The CMOS wafer 610 is bonded to the analog wafer 620 by the TSV 302 and the solder ball 304.

Figure 6:
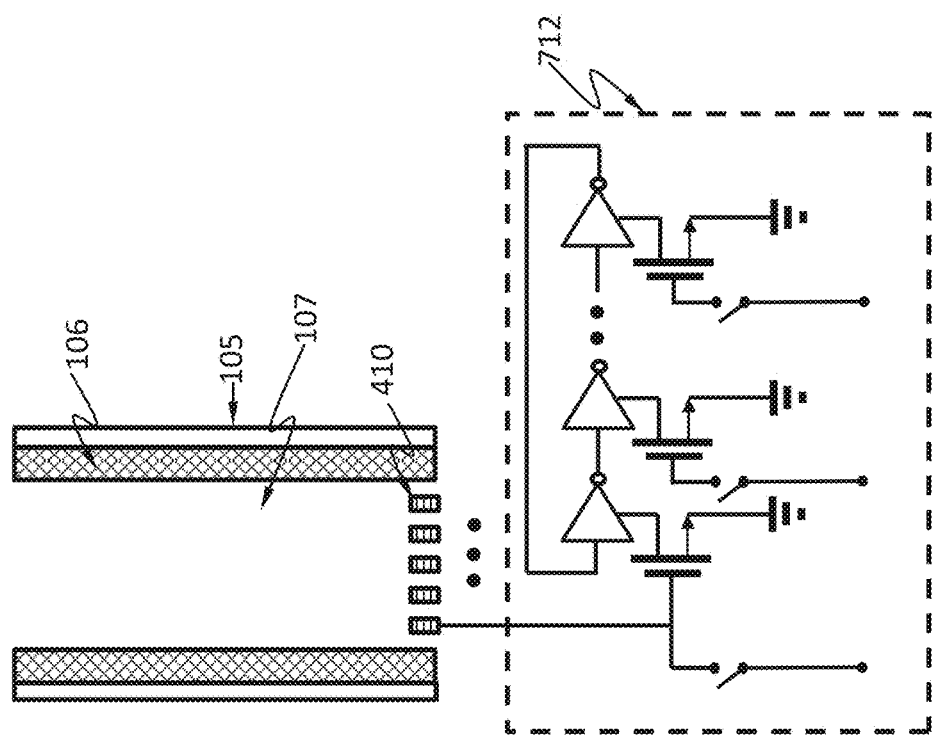
FIG. 6 schematically shows a partial cross-sectional view of another exemplary phototube including an oscillator, according to an embodiment of the present teaching.

FIG. 6 schematically shows a partial cross-sectional view of another exemplary phototube 700 including an oscillator, according to an embodiment of the present teaching, wherein like numbers reference like elements as in previous figures. Instead of including an amplifier, the phototube 700 in this example includes an oscillator 712. Gate voltage at the electrodes or transistors 410 changes the speed of the oscillator 712 (i.e., total delay). By comparing the oscillator 712 to a reference oscillator, a speed change can be determined to infer an existence of an incident photon. In practice, an oscillator is easy to make with advanced process than an amplifier and does not need any external signal to start or maintain the process of energy conversion.

It can be understood by one skill in the art that the above described phototubes 100-700 are for purposes of illustration and are not intended to limit the scope of the present teaching. Similar combinations or alternatives, e.g. a phototube including an a cylindrical hole and an oscillator, are as well within the scope of the present teaching.

Figure 7:
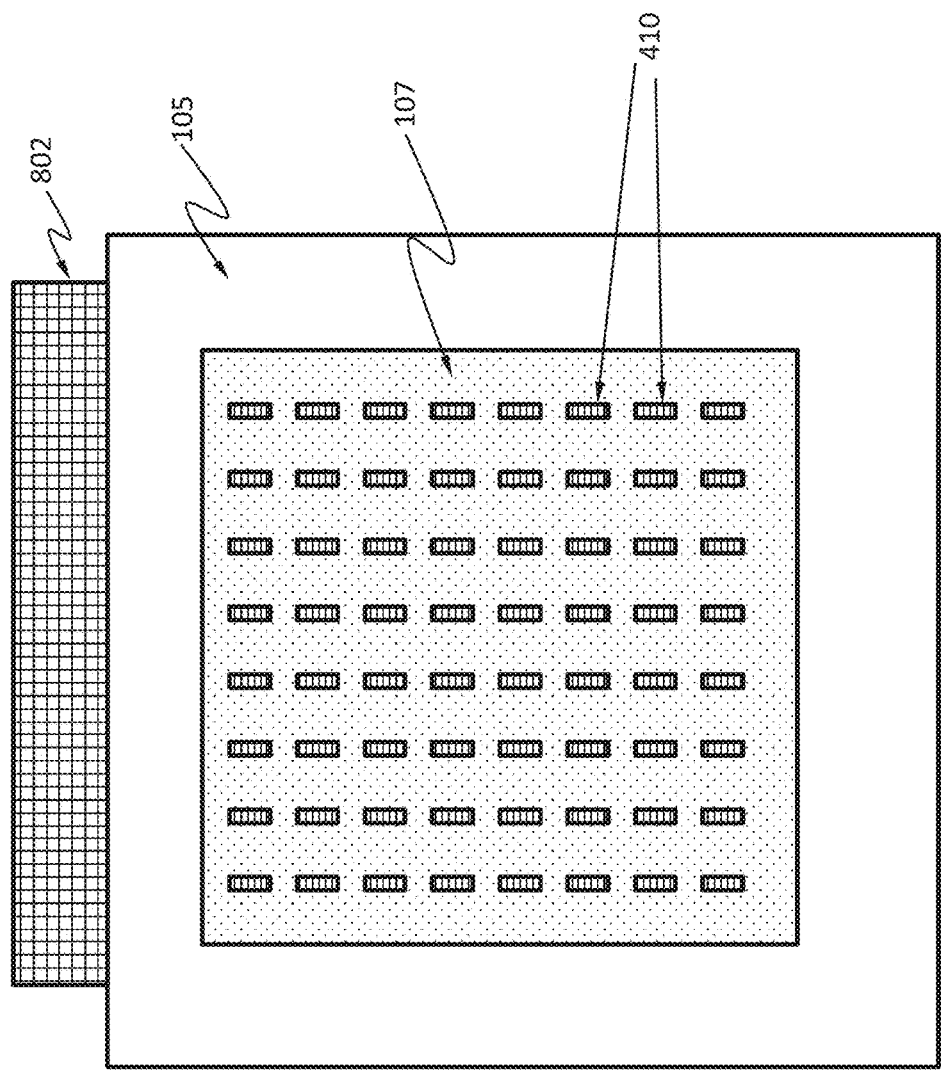
FIG. 7 shows an exemplary top view of a portion of an exemplary phototube, according to an embodiment of the present teaching.

FIG. 7 shows an exemplary top view of a portion of an exemplary phototube, according to an embodiment of the present teaching, wherein like numbers reference like elements as in previous figures. The phototube in FIG. 7 may be one of the phototubes 100-700 described in previous figures. In this example, the phototube includes a hole 107 formed by four sidewalls 105. The hole 107 here has a square section. The phototube here includes an array of electrodes or transistors 410 located in the hole 107.

In one embodiment, the phototube also includes a peripheral circuitry 802 bonded to an outside surface of one of the sidewalls 105. The peripheral circuitry 802 may include circuits, e.g. multiplexer, memory, processor, etc., that are shared by the pixels or the transistors.

Figure 8A:
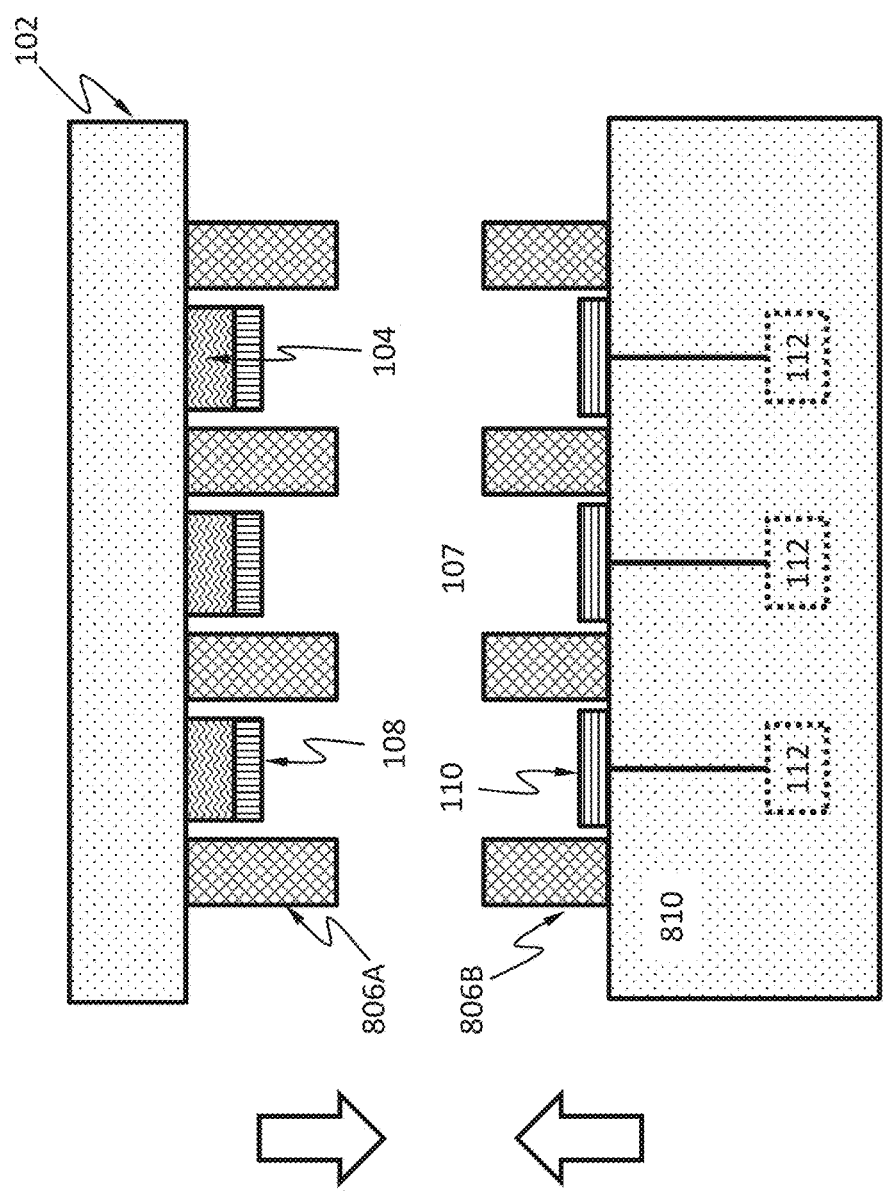
FIG. 8A, FIG. 8B and FIG. 8C each show an example where a hole of the phototube may be formed by bonding two substrates with a series of protrusions.
Figure 8B:
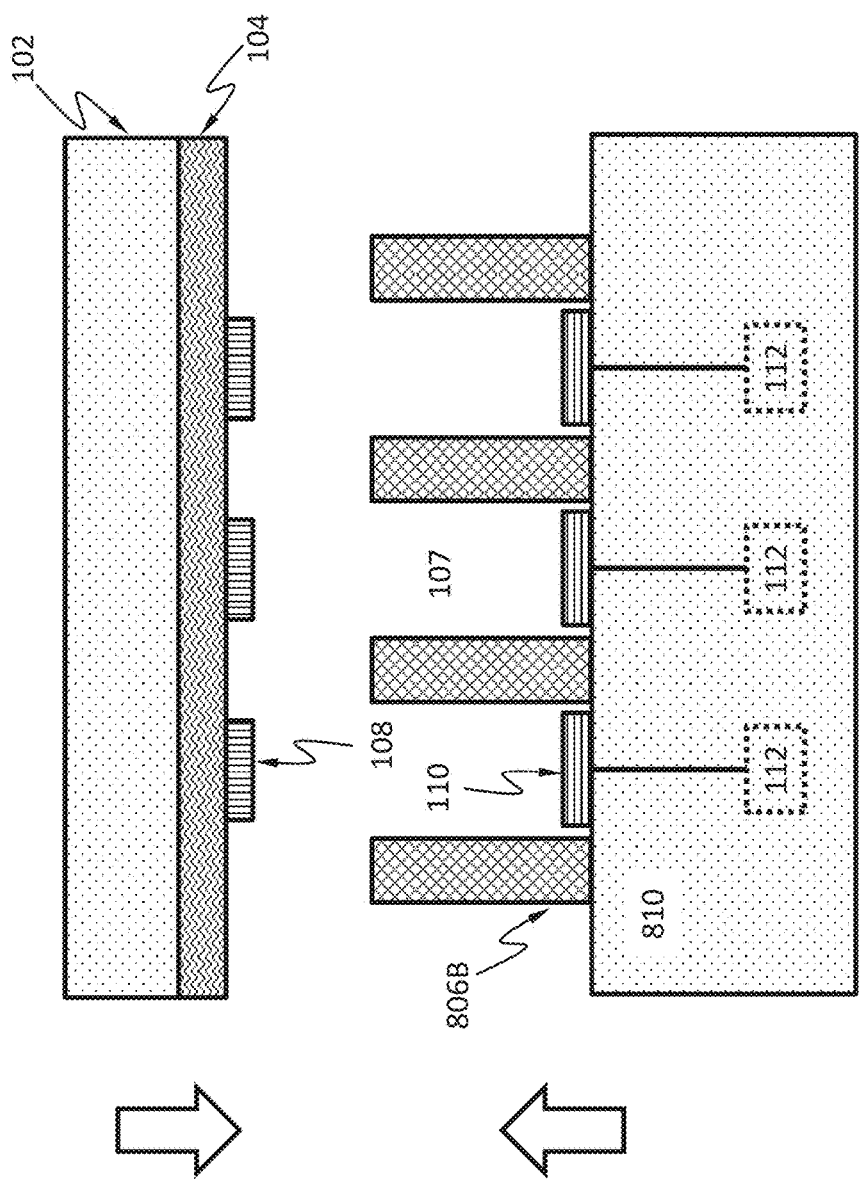
Figure 8C:
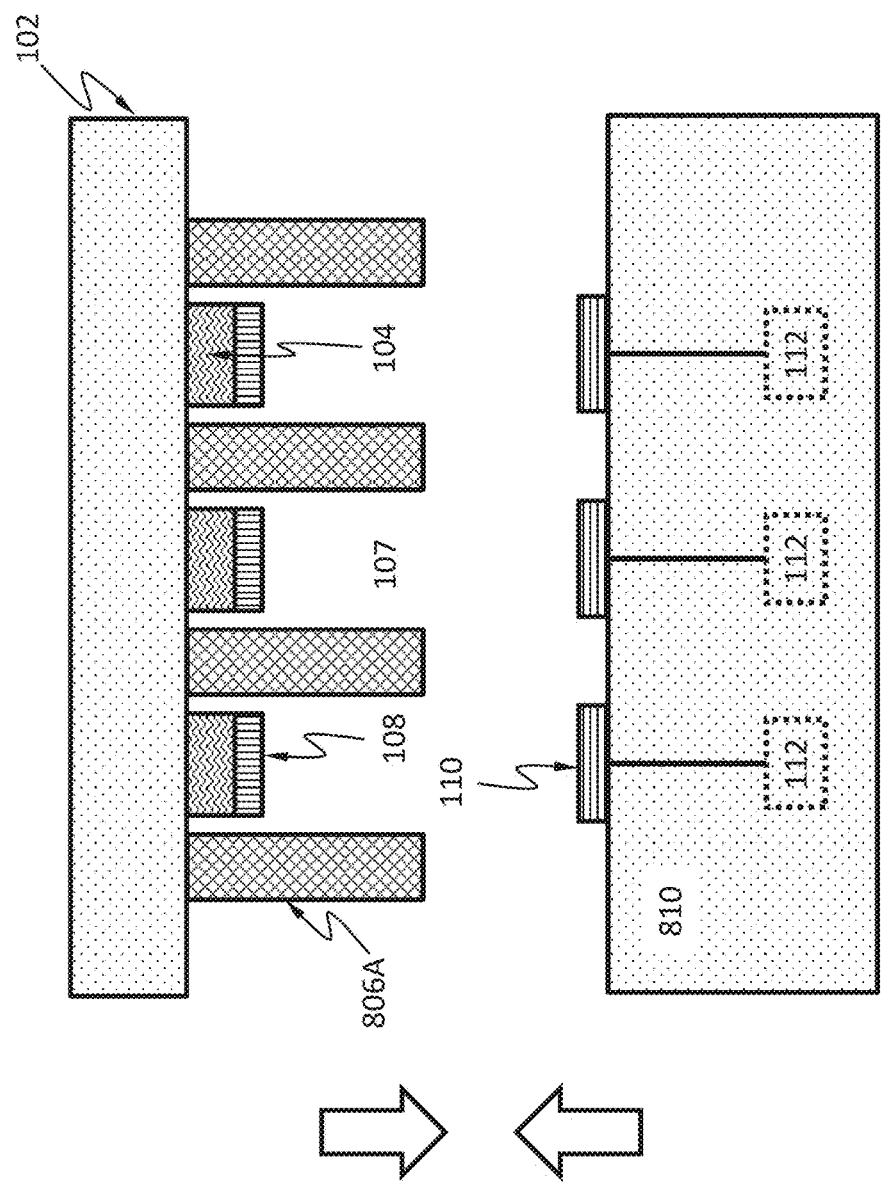

In an embodiment, the hole 107 is formed by bonding two wafers together, where at least one of the two wafers has a series of protrusions 806A/806B that form the sidewall of the hole 107. In the example shown in FIG. 8A, the supporting substrate 102 has the transparent electrode 104 deposited on and a series of protrusions 806A surrounding the transparent electrode 104; the detector including the amplifier 112 and the electrode 110 is constructed in a wafer 810, which also has a series of protrusions 806B surrounding the electrode 110. The supporting substrate 102 and the wafer 810 may be bonded so that the protrusions 806A and 806B are aligned and the hole 107 is formed thereby. FIG. 8B and FIG. 8C each show an alternative where only one of the supporting substrate 102 and the wafer 810 has protrusions. The protrusions 806A/806B may be any suitable material such as semiconductor, insulator, and metal and may be placed by a suitable method such as deposition or etching.

FIG. 9 schematically shows a system comprising the phototube described herein, according to an embodiment of the present teaching. The system may be used for detecting ionizing radiation from a source 901. The system comprises a scintillator 902 and the phototube 100 described herein. The scintillator 902 may absorb Gamma rays, X-rays, and the higher ultraviolet part of the electromagnetic spectrum that are radiated from the source 901, and emit visible light, which can then be detected by the phototube 100. The scintillator 902 may include sodium iodide. It can be understood that the phototube 100 in this system may be replaced by any of the phototubes 200-700 as disclosed herein.

Figure 10:
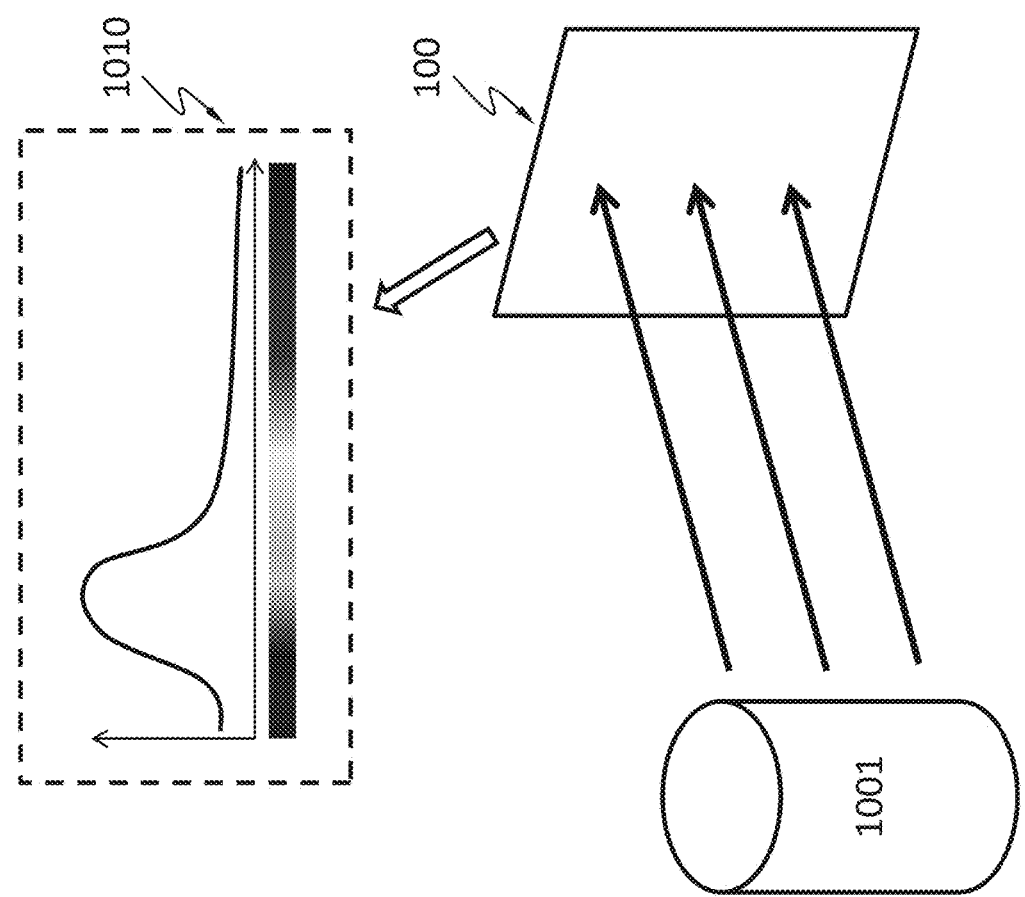
FIG. 10 schematically shows a system comprising the phototube described herein, suitable for measuring the intensity and spectrum of a light-emitting material, according to an embodiment of the present teaching.

FIG. 10 schematically shows a system comprising the phototube 100 described herein, according to an embodiment of the present teaching. The system may be used for measuring the intensity and spectrum of a light-emitting material 1001. The phototube 1001 may be a compound semiconductor or a quantum dot that emits light. With the phototube 100 described herein, the system in FIG. 10 may generate an intensity distribution 1010 on the spectrum of light emitted by the light-emitting material 1001. It can be understood that the phototube 100 in this system may be replaced by any of the phototubes 200-700 as disclosed herein.

Figure 11:
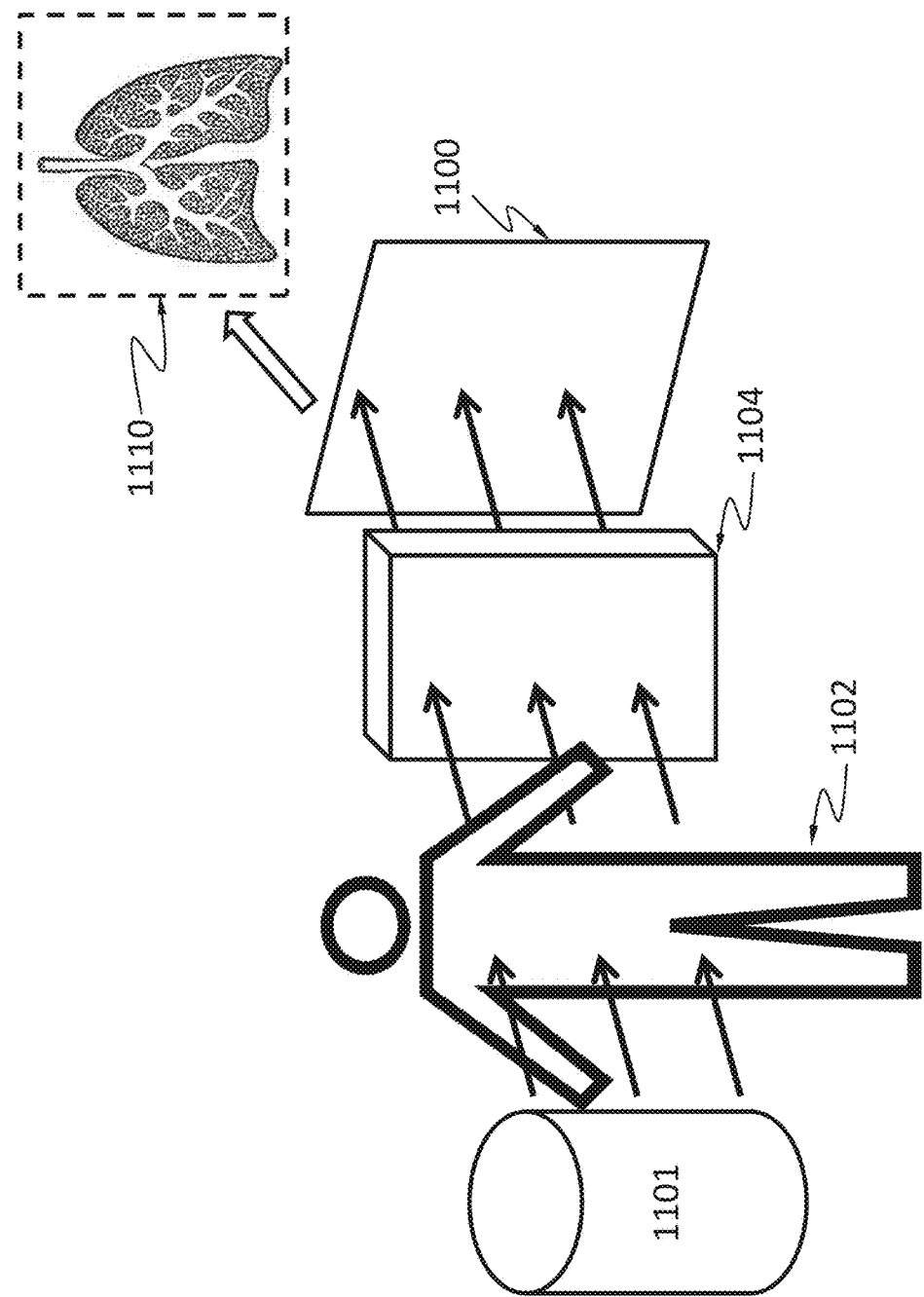
FIG. 11 schematically shows a gamma camera comprising the phototube described herein, suitable for imaging gamma radiation in medical imaging, according to an embodiment of the present teaching.

FIG. 11 schematically shows a gamma camera comprising the phototube described herein, according to an embodiment of the present teaching. The gamma camera here includes a Gamma ray source 1101, a scintillator 1104, and an array 1100 of phototubes which may be any of the phototubes 100-700 as disclosed herein. The gamma camera may be used for imaging gamma radiation in medical applications. As shown in FIG. 11, Gamma rays emitted from the Gamma ray source 1101 penetrate a human 1102, are attenuated by different degrees by the internal structures of the human 1102 (e.g., bones, muscle, fat and organs, etc.), are converted into visible lights by the scintillator 1104, and are projected to the phototube array 1100. The gamma camera may form an image of the human's body part (e.g. a lung image 1110) by detecting the intensity distribution of the Gamma rays.

FIG. 12 schematically shows a night vision device 1200 comprising the phototube described herein, according to an embodiment of the present teaching. The night vision device 1200 may be capable of producing images of a scene with levels of light approaching total darkness, e.g. when the visible light intensity is 4-5 orders of magnitude less than that during the day time. The night vision device 1200 may detect weak visible light or infrared and produce images in visible light perceivable by human eyes. In this example, the night vision device 1200 includes an image intensifier 1202 and a display 1204. The image intensifier 1202 may be made of an image sensor with an array of the phototubes as disclosed herein. The phototubes detect the local light intensities and convert the intensities into electrical signals. The electrical signals may then be presented as an image on a display 1204 so that human eyes can perceive that image. The signal of each of the phototubes may be represented by a pixel of the image. The phototubes may have a size of 100 μm or less.

The phototubes described herein may have other applications such as in nuclear and particle physics, astronomy, medical diagnostics including blood tests, medical imaging, motion picture film scanning, radar jamming, high-end image scanners known as drum scanners, or any other applications of a conventional PMT.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A phototube suitable for detecting a photon, the phototube comprising:
    an electron ejector configured for emitting electrons in response to an incident photon;
    a detector configured for collecting the electrons and providing an output signal representative of the incident photon;
    an electrode configured for applying a voltage to drive the electrons to the detector;
    one or more sidewalls forming an envelope of a hole between the electrode and the detector, wherein the electron ejector is inside the hole and bonded to the electrode, wherein the hole is in a substrate; and
    a metal wall at the one or more sidewalls, wherein the metal wall is configured for applying a voltage to drive the electrons away from the sidewalls.

2. The phototube of claim 1, wherein the hole includes an empty region between the electron ejector and the detector.

3. The phototube of claim 1, wherein the metal wall includes at least one of the following:
   a mesh of a conductive material;
   a solid metal sheet; and
   a plurality of metal lines.

4. The phototube of claim 1, further comprising a supporting substrate bonded to the electrode, wherein the electrode is between the supporting substrate and the electron ejector.

5. The phototube of claim 1, wherein the detector includes one or more electrodes and an amplifier electrically connected to the one or more electrodes.

6. The phototube of claim 5, wherein the amplifier is electrically connected to the one or more electrodes via a through-silicon via (TSV).

7. The phototube of claim 5, wherein each of the one or more electrodes includes a transistor whose output is directed into the amplifier.

8. The phototube of claim 1, wherein the hole has an acylindrical shape such that the hole gradually becomes smaller from the electrode to the detector.

9. The phototube of claim 1, wherein the detector includes one or more electrodes and an oscillator electrically connected to the one or more electrodes.

10. The phototube of claim 1, further comprising a peripheral circuitry bonded to an outside surface of one of the one or more sidewalls.

11. A night vision device suitable for producing an image viewable to a human eye, the night vision device comprising:
   the phototube of claim 1,
   wherein the phototube is configured for detecting a photon from a dimly light source.

12. The night vision device of claim 11, wherein the dimly light source emits either visible light or infrared at a light intensity that is at least 4-5 orders of magnitude less than that of daylight.

13. A method for making a phototube suitable for detecting a photon, the method comprising:
   forming a hole on a first substrate such that an envelope of the hole is formed by one or more sidewalls inside the first substrate;
   forming a metal wall at the one or more sidewalls, wherein the metal wall is configured for applying a voltage to drive the electrons away from the sidewalls;
   forming a detector at the bottom of the hole on the first substrate;
   forming an electron ejector on an electrode on a second substrate; and
   bonding the second substrate to the first substrate such that the electron ejector is inside the hole, wherein
   the electron ejector is configured for emitting electrons in response to an incident photon,
   the detector is configured for collecting the electrons and providing an output signal representative of the incident photon, and
   the electrode is configured for applying a voltage to drive the electrons to the detector.

14. The method of claim 13, wherein the hole includes an empty region between the electron ejector and the detector.

15. The method of claim 13, wherein the metal wall includes at least one of the following:
   a mesh of a conductive material;
   a solid metal sheet; and
   a plurality of metal lines.

16. The method of claim 13, wherein the detector includes one or more electrodes and an amplifier electrically connected to the one or more electrodes.

17. The method of claim 16, wherein the amplifier is electrically connected to the one or more electrodes via a TSV.

18. The method of claim 16, wherein each of the one or more electrodes includes a transistor whose output is directed into the amplifier.

19. The method of claim 13, wherein the hole has an acylindrical shape such that the hole gradually becomes smaller from the electrode to the detector.

20. The method of claim 13, wherein the detector includes one or more electrodes and an oscillator electrically connected to the one or more electrodes.

21. The method of claim 13, further comprising bonding a peripheral circuitry to an outside surface of one of the one or more sidewalls.

22. A method for making a phototube suitable for detecting a photon, the method comprising:
   providing a first substrate with a first electrode and an electron ejector on the first electrode;
   providing a second substrate with a second electrode and a detector connected to the second electrode;
   wherein at least one of the first substrate and the second substrate comprises a series of protrusions thereon;
   bonding the first substrate and the second substrate such that the first substrate, the second substrate, and the protrusions form a hole with the electron ejector being inside the hole;
   wherein the electron ejector is configured for emitting electrons in response to an incident photon;
   wherein the detector is configured for collecting the electrons and providing an output signal representative of the incident photon;
   wherein the first and second electrodes are configured for applying a voltage to drive the electrons to the detector; and
   wherein the hole comprises a metal wall at a sidewall of the hole and the metal wall is configured for applying a voltage to drive the electrons away from the sidewalls.

* * * * *